United States Patent
Rothenberger

(10) Patent No.: US 8,063,790 B2
(45) Date of Patent: Nov. 22, 2011

(54) SYSTEM AND METHOD FOR DETECTING THE PRESENCE OF AN OBJECT

(76) Inventor: David C. Rothenberger, Winnipeg (CA)

( * ) Notice: Subject to any disclaimer, the term of this patent is extended or adjusted under 35 U.S.C. 154(b) by 383 days.

(21) Appl. No.: 12/501,003

(22) Filed: Jul. 10, 2009

(65) Prior Publication Data

US 2011/0006907 A1 Jan. 13, 2011

(51) Int. Cl.
*G08B 21/00* (2006.01)
(52) U.S. Cl. .................. 340/686.6; 340/686.1
(58) Field of Classification Search .............. 340/686.1, 340/686.6, 552, 561, 565, 539.23, 8.1
See application file for complete search history.

(56) References Cited

U.S. PATENT DOCUMENTS

| | | | |
|---|---|---|---|
| 2008/0204700 A1* | 8/2008 | Reime | 356/5.01 |
| 2010/0185411 A1* | 7/2010 | Pfeiffer et al. | 702/150 |
| 2010/0289662 A1* | 11/2010 | Dasilva et al. | 340/686.6 |

* cited by examiner

*Primary Examiner* — Toan N Pham
(74) *Attorney, Agent, or Firm* — Kyle R. Satterthwaite; Ryan W. Dupuis; Ade & Company Inc.

(57) ABSTRACT

In a reflection type proximity detector or method, a controller calculates a calibration value based on ambient conditions with the transmitter off and then performs tests. In each test, the calibration value is added to and subtracted from a measured value taken with the transmitter in one state (on or off) and a second measured value is then taken and compared with this range. In tests where the transmitter is switched from off to on between the measurements and the second value exceeds the range, and tests where the transmitter is switched from on to off between the measurements and the second value is below the range, an object is detected. When the transmitter does not switch states between the measurements, and the second value is less than or greater than the range, then no object is detected, as the change in measured value likely resulted from an outside signal.

20 Claims, 3 Drawing Sheets

Infrared Proximity Detector - Block Diagram

Infrared Proximity Detector - Block Diagram

Infrared Source and Sensor - Design Example

SYSTEM AND METHOD FOR DETECTING THE PRESENCE OF AN OBJECT

FIELD OF THE INVENTION

The present invention relates generally to systems and methods of the type in which a sensor arrangement emits energy and monitors for reflection of the energy as an indicator of whether an object is present at a location proximate the sensor along the travel path of the signal.

BACKGROUND OF THE INVENTION

Proximity sensors or detectors of the foregoing type typically use radio frequency (RF) or infrared (IR) transmitters and receivers facing in a common direction so that RF or IR energy emitted by the transmitter is reflected back to the receiver when an object is present proximate the detector. Conventional systems of this type relying on energy from the source being reflected back to the receiver and measured then compare that measurement, either analog or digital, to a reference value. The results of that comparison are then used to determine if an object is within the detector's range or not. In some designs the reference value is altered slightly and the measurements repeated in an attempt to ensure that there is indeed an object present.

The infrared and RF spectrums are becoming quite noisy with either intentional or unintentional radiators. These signals can interfere with existing detection systems and cause false interpretations. That is, a signal received by the receiver from an energy source outside the detector may be interpreted by the detector as a reflection of energy emitted by the transmitter, resulting in a false-positive reading indicative of the presence of an object proximate the detector when in fact no such object is present.

It is therefore desirable to provide a proximity detector that minimizes the chances of a random detection. Applicant has developed the system and method detailed herein below to more reliably detect an object regardless of the extraneous signals from other sources and changing ambient conditions.

SUMMARY OF THE INVENTION

According to a first aspect of the invention there is provided a system for detecting presence of an object, the system comprising:

a transmitter operable to switch between on and off states to respectively activate and deactivate emanation of a detection signal from the transmitter along a path;

a receiver positioned to receive a reflection of the detection signal from off the object when situated proximate the transmitter in the path of the detection signal and generate a measurement signal in response to signals received by the receiver; and a controller connected to the transmitter and the receiver to control switching of the transmitter between the on and off states, to selectively receive the measurement signal and associate a measurement value therewith, and to establish a range of values around the measurement value spanning from a lower range limit below the measurement value to an upper range limit above the measurement value the controller being arranged to perform at least one state-change test in each of which the controller receives a first measurement signal from the receiver with the transmitter a respective one of the on and off states, associates a first measurement value with the first measurement signal, establishes a first range of values around said first measurement value, receives a second measurement signal from the receiver with the transmitter in a respective opposite one of the on and off states, associates a second measurement value with the second measurement signal, and determines whether the second measurement value falls inside the first range of values, which indicates absence of the object in the path of the detection signal proximate the transmitter.

Preferably the controller is arranged to perform a sequence of tests comprising the at least one state-change test and at least one same-state test in which the controller receives two measurement signals with the transmitter in a same respective one of the on and off states, associates two respective measurement values with two measurement signals, establishes a respective range of values around one of the two respective measurement values and determines whether the other of the two respective measurement values falls outside the respective range of values, which provides indication that an extraneous signal source has acted on the receiver and that the sequence of tests accordingly does not confirm presence of the object in the path of the detection signal proximate the transmitter.

Preferably the controller is arranged such that the at least one state-change test comprises a change-up test in which the first and second measurement signals are received with the transmitter in the off and on states respectively and a change-down test in which the first and second measurement signals are received with the transmitter in the on and off states respectively.

Preferably the controller is arranged such that the at least one same-state test comprises a on-only test in which the two measurement signals are received with the transmitter in the on state and an off-only test in which the two measurement signals are received with the transmitter in the off state.

Preferably the controller is arranged such that one of the two measurement signals of the same-state test is defined by a respective one of the first and second measurement signals of the state-change test.

Preferably the controller is arranged such that the one of the two respective measurement signals of the same-state test is defined by the measurement value associated with the respective one of the first and second measurement values of the state-change test.

Preferably the controller is arranged such that the on-only test follows the change-up test and the second measurement signal of the change-up test defines a first of the two measurement signals of the on-only test.

Preferably the controller is arranged such that the second measurement value of the change-up test defines the respective measurement value corresponding to the first of the two measurement signals of the on-only test.

Preferably the controller is arranged such that the change-down test follows the on-only test and the first measurement signal of the change-down test is defined by a second of the two measurement signals of the on-only test.

Preferably the controller is arranged such that the first measurement value of the change-down test is defined by the respective measurement value corresponding to the second of the two measurement signals of the on-only test.

Preferably the controller is arranged such that the off-only test follows the change-down test and the second measurement signal of the change-down test defines a first of the two measurement signals of the off-only test.

Preferably the controller is arranged such that the second measurement value of the change-down test defines the respective measurement value corresponding to the first of the two measurement signals of the off-only test.

Preferably the controller is arranged such that the change-up, on-only, change-down and off-only tests are carried out and then repeated.

Preferably the controller is arranged such that, in repetition of the tests, the change-up test follows the off-only test and the first measurement signal of the change-up test is defined by a second of the two measurement signals of the off-only test.

Preferably the controller is arranged such that, in the repetition of the tests, the first measurement value of the change-up test is defined by the respective measurement value corresponding to the second of the two measurement signals of the off-only test.

Preferably the controller is arranged to begin a sequence of tests and terminate the sequence of tests prior to completion thereof should results of any test within the sequence indicate absence of the object in the path of the detection signal proximate the transmitter.

Preferably the controller is arranged to terminate the sequence of tests prior to completion thereof should results of any test within the sequence indicate an extraneous signal source has acted on the receiver.

Preferably the controller is arranged to output a presence detection signal upon completion of the sequence of tests.

Preferably the controller is arranged to determine the range using an ambient conditions measurement value based on an ambient conditions measurement signal sent from the receiver with the transmitter in the off state.

Preferably the controller comprises a micro-controller.

Preferably the transmitter and the receiver comprise an infrared transmitter and infrared receiver respectively.

According to a second aspect of the invention there is provided a system for detecting the presence of an object, the system comprising:

a transmitter operable to switch between on and off states to respectively activate and deactivate emanation of a detection signal from the transmitter along a path;

a receiver positioned to receive a reflection of the detection signal from off the object when situated proximate the transmitter in the path of the detection signal and generate a measurement signal in response to signals received by the receiver; and a controller connected to the transmitter and the receiver to control switching of the transmitter between the on and off states, to selectively receive the measurement signal and associate a measurement value therewith, and to establish a range of values around the measurement value spanning from a lower range limit below the measurement value to an upper range limit above the measurement value;

the controller being arranged to perform:

a calibration step in which the controller receives an ambient conditions signal from the receiver with the transmitter in the off state, associates an ambient conditions value with said ambient conditions signal and calculates a range determination value based on said ambient conditions value;

a change-up test in which the controller adds and subtracts the range determination value to and from a first change-up test value associated with a first change-up test signal received from the receiver with the transmitter in the off state to establish a range of change-up test values around said first change-up test value, receives a second change-up test signal from the receiver with the transmitter in the on state, associates a second change-up test value with the second change-up test signal, and determines whether the second change-up test value falls inside the range of change-up test values, which indicates absence of the object in the path of the detection signal proximate the transmitter;

a change-down test in which the controller adds and subtracts the range determination value to and from a first change-down test value associated with a first change-down test signal received from the receiver with the transmitter in the on state to establish a range of change-down test values around said first change-down test value, receives a second change-down test signal from the receiver with the transmitter in the off state, associates a second change-down test value with the second change-down test signal, and determines whether the second change-down test value falls inside the range of change-down test values, which indicates absence of the object in the path of the detection signal proximate the transmitter; and at least one same-state test in each of which the controller adds and subtracts the range determination value to and from a first same-state test value associated with a first same-state test signal received from the receiver with the transmitter in a respective one of the on and off states to establish a first range of same-state test values around said first same-state test value, receives a second same-state test signal from the receiver with the transmitter in the opposite one of the on and off states, associates a second same-state test value with the second same-state test signal, and determines whether the second same-state test value falls inside the range of same-state test values, which indicates absence of the object in the path of the detection signal proximate the transmitter.

Preferably the microcontroller is arranged to overlap at least two of the tests such that the second signal from one of said at least two of the tests defines the first signal of a next one of said at least two tests.

According to a third aspect of the invention there is provided a method for detecting presence of an object, the method comprising:

providing a transmitter operable to switch between an on state in which a detection signal emanates from the transmitter along a path and an off state in which no such signal detection signal emanates from the transmitter;

providing a receiver positioned to receive a reflection of the detection signal from off the object when situated proximate the transmitter in the path of the detection signal and generate a measurement signal in response to signals received by the receiver;

providing a controller connected to the transmitter and the receiver to control switching of the transmitter between the on and off states, to selectively receive the measurement signal and associate a measurement value therewith, and to establish a range of values around the measurement value spanning from a lower range limit below the measurement value to an upper range limit above the measurement value; and performing at least one state-change test each comprising:
sending a first measurement signal from the receiver to the controller while the transmitter is in a respective one of the on and off states;
associating a first measurement value with the first measurement signal;
establishing a first range of values around said first measurement value;
switching the transmitter into a respective opposite one of the on and off states;
sending a second measurement signal from the receiver to the controller while the transmitter is in said opposite one of the on and off states;

associating a second measurement value with the second measurement signal; and determining whether the second measurement value fails inside the first range of values, which indicates absence of the object in the path of the detection signal proximate the transmitter.

BRIEF DESCRIPTION OF THE DRAWINGS

In the accompanying drawings, which illustrate an exemplary embodiment of the present invention.

DETAILED DESCRIPTION

In electronics, comparators often use hysteresis to ensure that once a threshold is crossed and a condition is set as a result, the condition doesn't reset from a minor level change. When hysteresis is used the subsequent reset must be due to a level change that is greater than any possible noise or random level fluctuation. The system of the illustrated embodiment of the present invention uses the measurement and computational ability of a Micro Controller to expand the concept of hysteresis into a range of values above and below the measured value. For a subsequent measurement to be considered greater than the first it must also be greater than the first measurement's range of values. For a subsequent measurement to be considered less than the previous measurement it must also be less than the previous measurement's range of values. It follows then that a subsequent measurement will be equal to the previous measurement even if it is equal to any of the previous measurement's range of values.

Figure 2:
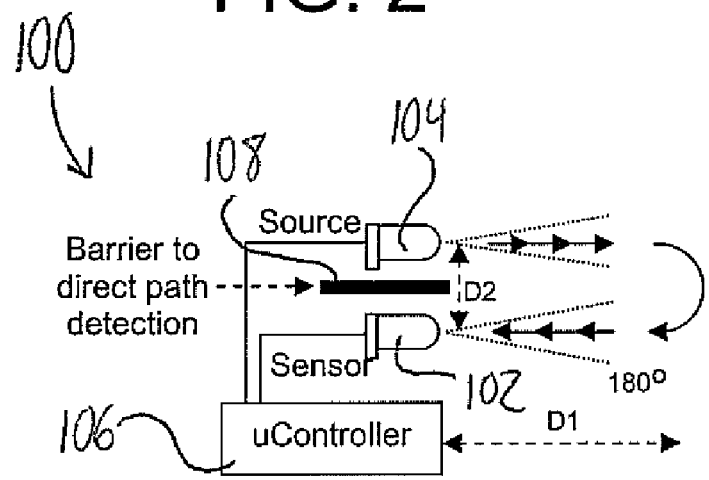
FIG. 2 is a block diagram of the infrared proximity detector according to the present invention.
Figure 3:
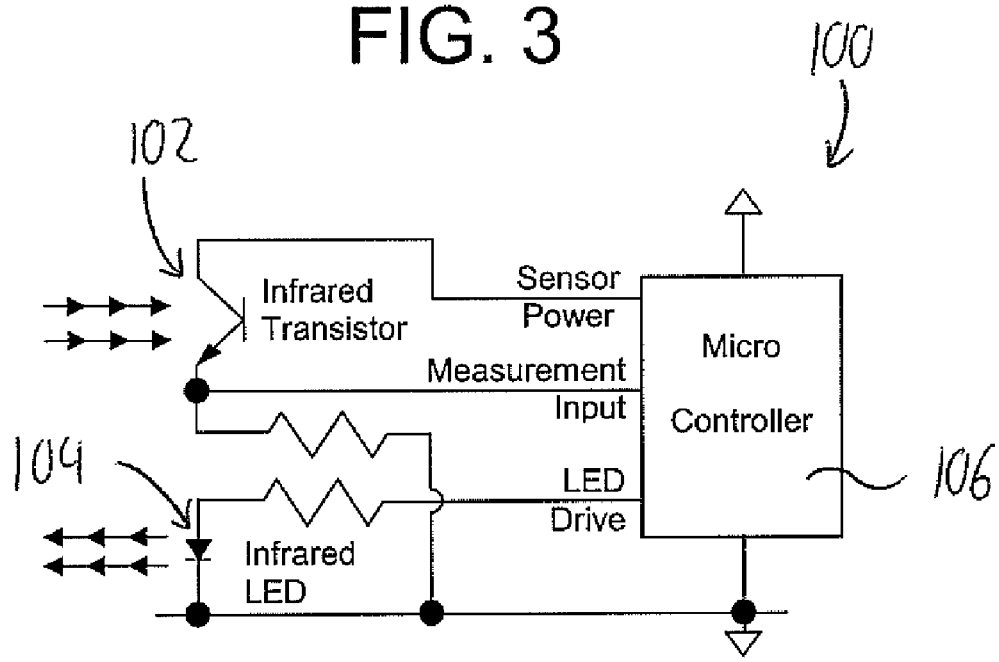
FIG. 3 is a schematic diagram of the proximity detector of FIG. 2.

With reference to FIGS. 2 and 3, the object detection system 100 of the illustrated embodiment is comprised of a sensor (receiver) 102 and a like style source (transmitter) 104 oriented so that the emanations of the source are angled (focused) 180 degrees to the angle (focal path) of the sensor while the two units are mounted in close proximity to each other in a generally side-by-side arrangement. Both units are controlled and monitored by a micro controller or micro processor type of device 106 that makes an "Object Detected"/"No Object Detected" determination based on the sensor response to specific stimuli. As schematically illustrated by a barrier 108 disposed between the source (transmitter) 104 and the sensor (receiver) 102 in FIG. 2, appropriate detector construction practices should be made to ensure the source 104 and the sensor 102 do not communicate with one another directly, thereby ensuring that energy emitted from the source is only detected by the sensor when reflected off an object back toward the detector 100.

The source (transmitter) and the sensor (receiver) perform a series of emanations and measurements where the actual value of the measurement is not of importance. It is the difference or similarity between the present measurement value and the last measurement value that matters. This process consists of four different tests. These tests are designed to work together to confirm or refute that the received signal is reflected off an object and did not originate from an outside source. If any of these tests fail, the process declares "no object detected," exits the process and may go onto other processes until it's time to start this one again. For example, where the proximity detector is incorporated as part of a larger overall system, the micro-controller may run one or more other processes between executions of the proximity detection process to control other aspects of the overall system.

We start with the understanding that when the routine measures a value there exists a range of values that are greater than and less than the measured valued but are close enough for all these values to be considered equal. This "Range" is calculated at the beginning of each routine and is then applied to each test performed within the routine.

At the beginning of the routine an initial measurement is made by the sensor with the source turned off. This will provide a value that represents the ambient conditions in the environment in which the detector is being used for the brief period in time when the tests are to be performed. Essentially, this initial measurement is a calibration for that brief period of time. A percentage of this measured value plus a constant are used to create a plus or minus factor to be applied to the next measurement.

(Measured Value×%)+Constant=Plus or Minus Factor

Being determined from the same calculation, the plus and minus factors are equal in absolute value, differing only in the final sign applied to them. In other words, the minus factor is the negative of the plus factor. This defines a range of values spanning from the minus factor to the plus factor. As opposed to the use of a percentage alone in calculation of the plus and minus factor, a constant is added to avoid generation of a zero range during very low level ambient conditions. As an example: 12% of a measured value of 4 is 0.48 and would be truncated to 0 by the Micro Controller, resulting in a zero values for the plus factor, minus factor and range.

The value selected for a constant will depend on the upper and lower limits of all possible measured values as well as the choice of sensor. An easy way to determine a suitable constant is to use empirical testing with different values until the desired response is consistently obtained from very dark ambient light conditions through to very bright conditions. In a low voltage application the sensor may be forced to operate primarily in the non-linear response region of the device. This may require the use of a larger percentage to compensate for sensitivity changes as the ambient light increases. Designs using higher operating voltages (e.g. five volts or greater) will experience better results with a reduced percentage and an increased constant because the bulk of the response curve for the device will be in its linear region.

As an example, if the initial measurement resulted in a decimal value of 25 with an applied percentage of 12 and constant of 2, then the Range would be +5 to −5. This means that a subsequent measurement could have values of up to 5 higher and down to 5 lower than the first measured value and still be considered equal to the initial measurement. As indicated above, the best percentage and constant value to be used can be determined easily through empirical testing.

Ideally, a table could be created through empirical research containing every possible measured value for ambient light conditions and a corresponding Range value that would result in consistent Object Detected/No Object Detected determinations. Unfortunately this would require an inordinate amount of work and use a significant amount of program memory within the microcontroller. The described use of a percentage plus a constant in the Range determination is not quite as accurate, but presents a much more reasonably implementable and memory efficient solution providing results of a sufficient level of accuracy close enough to meet the needs of most or all conceivable applications of the detector.

Figure 4:
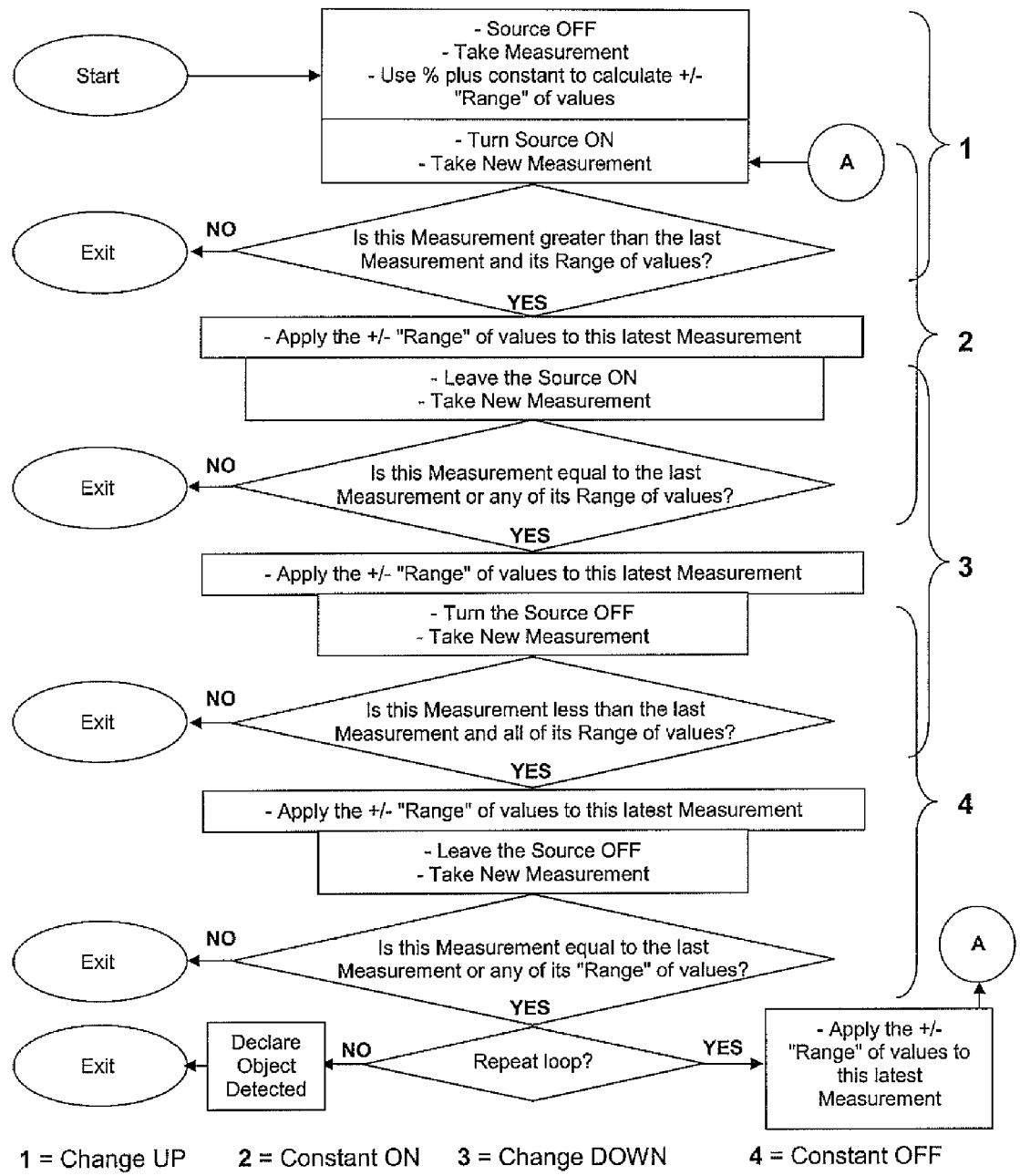
FIG. 4 is a flow chart of a proximity detection method carried out by the infrared proximity detector of the present invention.

With reference to FIG. 4, the routine has four different tests that are completed sequentially after the initial measurement and "Range" calculation have been performed.

1) A Change-Up Test—With the source off, record the measured value of the sensor. Apply the Range to this measured value to create a group of values all of which are to be considered equal to the measured value. Enable the Source (transmitter). Record the new Sensor (receiver) value. Determine whether or not this new measurement exceeds the just calculated group of values, as one would expect it to if there is indeed an object present to reflect the signal emanated from the source during this test back to the sensor. If it is not greater than the entire group of values then the test fails; there is no object present and the system should exit the routine. If the test passes, the routine should move on to the next test.

2) A Constant-On Test—With the source on, record the measured value of the sensor. Apply the Range to this measured value to create a group of values all of which are to be considered equal to the measured value. Keep the Source (transmitter) on. Record a new Sensor (receiver) value. Determine whether or not this new measurement falls within the last group of values, as one would expect it to if no outside energy source has influenced one of the sensor readings in this test. If this measurement doesn't equal any of these values, then an outside influence has affected the energy level read by the Sensor, meaning that the system should not confirm the presence of an object regardless of the result of the previous test since this outside influence may have also affected the sensor readings in the first test. Rather than rely on potentially inaccurate test results, the system declares that there is no object and exits the routine. On the other hand, if the new measurement does equal any of the values in the last group of values, then the routine should move on to the next test.

3) A Change-Down Test—With the source on, record the measured value of the sensor. Apply the Range to this measured value to create a group of values all of which are considered to be equal to the measured value. Disable the Source (transmitter). Record the new Sensor (receiver) value. Determine whether or not this new measurement falls below the just calculated group of values, as one would expect it to if there is indeed an object present to have reflected the signal emanated from the source during this test back to the sensor. If it is not less than the entire group of values then the test fails, then there is no object and the system should exit the routine. If the test passes, the routine should move on to the next test.

4) A Constant Off—With the source off, record the measured value of the sensor. Apply the Range to the measured value to create a group of values all of which are considered to be equal to the measured value. Keep the Source (transmitter) off. Record a new Sensor (receiver) value. Determine whether or not this new measurement falls within the latest group of values, as one would expect it to if no outside energy source has influenced one of the sensor readings in this test. If this measurement doesn't equal any of these values, then an outside influence has affected the energy level read by the Sensor, meaning that the system should not confirm the presence of an object regardless of the result of the previous tests, since this outside influence may have also affected the sensor readings in those preceding tests. Rather than rely on potentially inaccurate test results, the system declares that there is no object and exits the routine. On the other hand, if the new measurement does equal any of the values in the last group of values, then the routine should move on to the next test, or declare an object detected if the completion of this test marks the end of an execution of the detection process.

The amount of time waited between measurements taken before and after the source switches from its on state to off state, or vice-versa, depends on the sensor's ability to respond to a change in the source's on/off status. That is, the time delay from a change in the source's state to the taking of a measurement from the sensor should exceed the amount of time it takes for the sensor to settle on a final value to ensure accurate readings taken from the sensor. Methods for measuring/approximating this sensing time in order to select a delay that safely exceeds this sensing time are well known in the art. This same period of time can preferably also be used as the delay time between measurements for the Constant On and the Constant Off tests.

As illustrated in FIG. 4, sequentially completed tests in the routine can overlap with one another. As an example from the illustrated embodiment of the process, the Change-Up Test starts with the source off and then turns it on. This turn on can act as the first part of the Constant On. In other words, the second measurement value of the Change-Up Test, taken with the source on, is used as the first measurement value of the Constant-On Test. In an alternate embodiment where the tests are carried out in different order than in the illustrated embodiment, the second measurement value of the Change-Up Test could be used as the first measurement value of the Change-Down Test. Likewise, the second measurement value of the Change-Down Test is used as the first measurement value of the Constant-Off Test in the illustrated embodiment, and may be used as the first measurement value of the Change-Up Test in an alternative embodiment. As shown for the illustrated embodiment, the second measurement value of the Constant-On Test can be used as the first measurement value of the Change-Down Test. Efficiencies in time and power consumption could be garnered by combining tests is this manner. The Micro Controller can be programmed to keep track of it all.

It is not necessary to exit the routine on the first failed test. It may be easier to program a routine that completes the entire process sequence before making an Object Detected/No Object Detected determination. However, if power usage is important, then the routine should declare No Object Detected and exit on the first failed test.

These four tests can be sequenced in many unique patterns and further enhanced through repetition. The optional repetition is demonstrated by the illustrated process of FIG. 4, in which the micro-controller is configured to carry out a repetition of the sequence of four tests should the first execution of this sequence be completed without failure of any test. Additionally, the process need not necessarily include all four tests of the preferred illustrated embodiment. However, at minimum, the process should include execution of at least one of the Change-Up Test or Change-Down Test where the measurements of the test are taken before and after the change in the source's state from off to on or on to off. The Constant-On Test and Constant-Off Test are useful in helping ensure that energy from an outside source does not provide a false-positive indication of an object's presence, but alone cannot confirm the presence of an object. Each of these same-state tests takes two measurements while the source remains in the same on or off state, and so in an ideal controlled environment with no change in ambient conditions and no outside interference sources, one would expect the two measurements to be equal regardless of whether there is an object present to reflect energy during both measurements or no object present during both measurements. Therefore, passing of either one of these same-state tests suggests that no outside source was active to throw off one of the test's measurements relative to the other, but does not confirm or refute the presence of an object in the source's signal path. Therefore, execution of at least one of the Change-Up or Change-Down state-change tests is required to indicate the presence of an object. Failure of either of the same-state tests suggests that an outside source influenced one of the measurements, and that the process should not conclude that an object is present since the same outside source may have tainted the results of another test.

The duration of each test can be from microseconds to milliseconds. The speed with which the hardware can respond to the controller stimulus and received energy is the limiting aspect on how fast the system can operate. And, the estimated length of time an object will remain within the system's range of detection, for example based on a particular context in which the system is intended to be used, limits how long the system can take to make its determination. This routine is successful because it doesn't just look for an indication of reflected infrared energy; it also takes steps to ensure that errant emissions from third party sources are not being misconstrued as nearby objects.

An Example Using Theoretical Values

Figure 1:
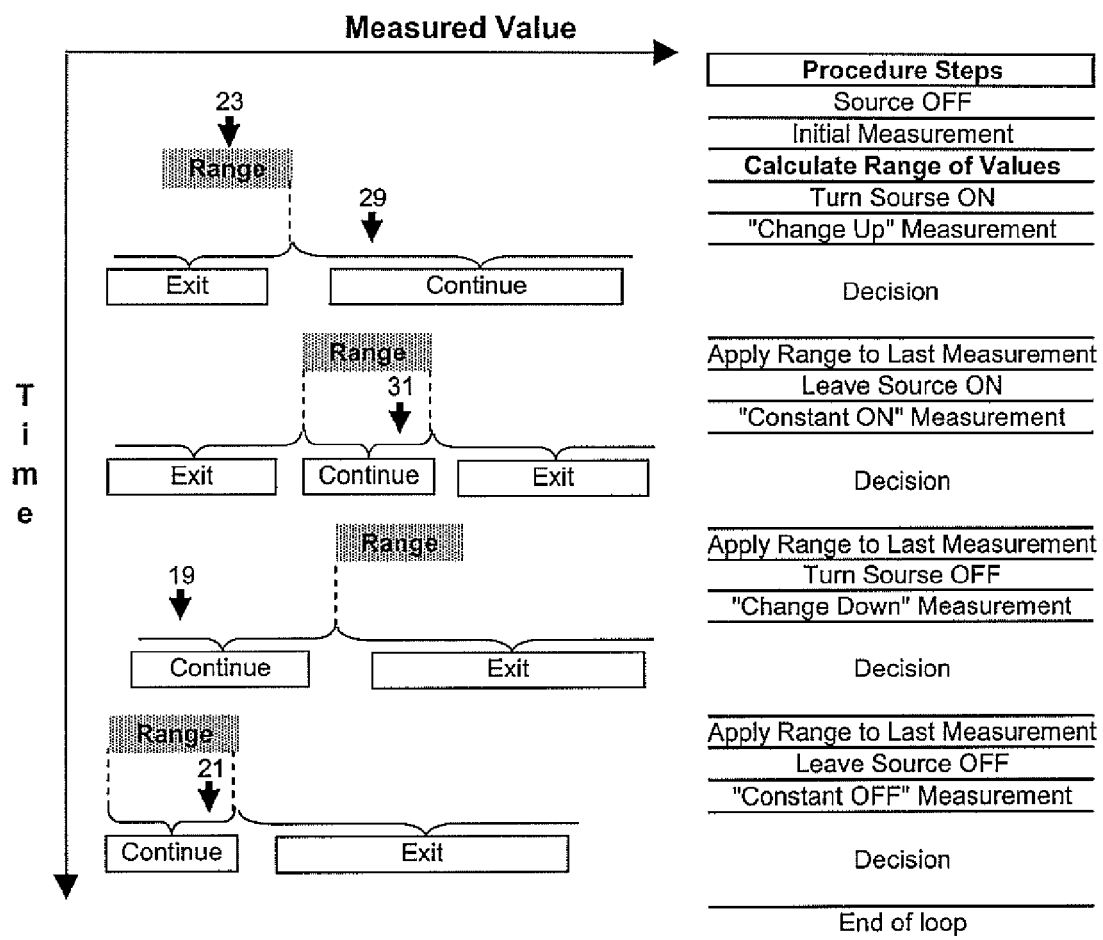
FIG. 1 is a schematic illustration of a process carried out by an infrared proximity detector according to the present invention in order to detect the presence of an object proximate the detector, including theoretic values processed by the detector during an exemplary execution of the process.

FIG. 1 schematically illustrates a single execution of the four step routine of FIG. 1. In this example, the process is repeatedly initiated at an interval of 60 times a second using a percentage of 12% and a Constant of 2 a) The source (transmitter) is in a disabled state while the sensor (receiver) makes a measurement. It records a value 23. With decimal places being rounded to the nearest integer, the "Range" is calculated as $+/-((23\times0.12)+2)=-5$ to $+5$.

b) Test One (Change Up)—The source (transmitter) is enabled and the sensor (receiver) measures the ambient conditions looking for reflected energy. It measures a value of 29. This is above the Range of 18 to 28 (23 minus 5 to 23 plus 5) so the routine will carry on to the next step. Had this reading been anything from 0 to 28 the process would declare no object present, stop further testing and restart at the beginning of the next period. Stopping at this point would have the benefit of saving system power and computational time. But the reading was outside the "Range" so the test passes and the process continues.

c) Test Two (Constant On)—The source (transmitter) remains enabled and the sensor (receiver) again measures the conditions looking for reflected energy. This time it measures a value of 31. The last value measured was 29. So 29 minus 5, and 29 plus 5 result in a Range values from 24 to 34. The measured value falls within this group and it is therefore valid to continue. Had this measured value been anything from 0 to 23 or greater than 34, the process would declare no object present, stop further testing and wait to restart the process at the beginning of the next interval. It is possible that the last measurement had been caused by some other source that had now turned off or was between pulses. This test helps safeguard against some of the interference from outside sources.

d) Test Three (Change Down)—The source (transmitter) is disabled and the sensor (receiver) again records a measurement for the present conditions. A 19 is recorded. The last value was a 31 with a calculated range for this step of 26 to 36. 19 falls below this group of values. This indicates that the measurement value drop was due to disabling the system source. Had this measurement fallen within the group or been above it, the process would declare no object detected.

e) Test Four (Constant Off)—The source (transmitter) remains disabled and the sensor (receiver) again records a measurement. The last reading was a 19 so the Range of values is calculated to be from 14 to 24. The measurement is 21 which falls within this group of values. The system could now declare an object has been detected. However, there is still a chance that these readings were the result of an outside energy source, for example a nearby active TV remote control, and not a nearby object.

f) To further reduce the chances of a false object-detection, all the tests are preferably repeated at least one more time, and the process is preferably halted with the first test to fail.

There are many possible designs that can perform these tasks, for example an analog measurement circuit with gate logic control could be used but would be extremely excessive in size and thus typically represent a very undesirable and inefficient construction, and so the use of a Micro Controller is preferable to minimize the parts required to make the process work. In a preferred embodiment a Micro Controller with a built in analog to digital converter, a small amount of RAM and sufficient ability to perform the necessary calculations is desirable. Furthermore, an infrared LED provides a cost effective Source while an infrared transistor in a common collector arrangement with an appropriately sized resistor is a simple sensor design. To conserve even more energy, the collector of the infrared transistor can be connected directly to the Micro Controller. The Micro Controller will then only supply power to the infrared transistor when a measurement is needed (See FIG. 3).

The present application provides a proximity detection system and procedure for situations where the possibility of a false detection must be minimized and where circumstances require the radiating element and sensing element to be in closer proximity to each other than the items which they are to detect. The detection method of the illustrated embodiment differs from the prior art in that it employs a self calibration and execution of four different tests before determining whether or not an object is present. This design does not require the routine to run continuously. As with most systems there can be a period of time between routines when other tasks are performed or the system actually goes to sleep. As an example this routine could be run at a prescribed interval of once every ½ second. How quickly an object must be detected will influence the period of time between routines.

Although the preferred embodiments are described in terms of a proximity detector and method using an infrared source and sensor pairing, the detection routine will work with RF, Infrared, Ultrasonic or even visible light. Infrared embodiments are preferred to minimize shielding challenges, i.e. difficulty in ensuring the transmitter and receiver don't "talk" or communicate directly. RF and Ultrasonic source/sensor detector arrangements are also relatively expensive, draw more power and are physically larger, and a visible light transmitter and receiver combination would likely be undesirable for most proximity detector applications.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. A system for detecting the presence of an object, the system comprising:

a transmitter operable to switch between on and off states to respectively activate and deactivate emanation of a detection signal from the transmitter along a path;

a receiver positioned to receive a reflection of the detection signal from off the object when situated proximate the transmitter in the path of the detection signal and generate a measurement signal in response to signals received by the receiver; and a controller connected to the transmitter and the receiver to control switching of the transmitter between the on and off states, to selectively receive the measurement signal and associate a measurement value therewith, and to establish a range of values around the measurement value spanning from a lower range limit below the measurement value to an upper range limit above the measurement value;

the controller being arranged to perform at least one state-change test in each of which the controller receives a first measurement signal from the receiver with the transmitter in a respective one of the on and off states, associates a first measurement value with the first measurement signal, establishes a first range of values around said first measurement value, receives a second measurement signal from the receiver with the transmitter in a respective opposite one of the on and off states, associates a second measurement value with the second measurement signal, and determines whether the second measurement value falls inside the first range of values, which indicates absence of the object in the path of the detection signal proximate the transmitter.

2. The system according to claim 1 wherein the controller is arranged to also perform at least one same-state test, in each of which the controller receives two measurement signals with the transmitter in a same respective one of the on and off states, associates two respective measurement values with the two measurement signals, establishes a respective range of values around one of the two respective measurement values and determines whether the other of the two respective measurement values falls outside the respective range of values, which indicates that an extraneous signal source has acted on the receiver and that the sequence of tests accordingly does not confirm presence of the object in the path of the detection signal proximate the transmitter.

3. The system according to claim 2 wherein the controller is arranged such that the at least one same-state test comprises an on-only test in which the two measurement signals are received with the transmitter in the on state and an off-only test in which the two measurement signals are received with the transmitter in the off state.

4. The system according to claim 2 wherein the controller is arranged such that the at least one state-change test comprises a change-up test in which the first and second measurement signals are received with the transmitter in the off and on states respectively and a change-down test in which the first and second measurement signals are received with the transmitter in the on and off states respectively, and the at least one same-state test comprises an on-only test in which the two measurement signals are received with the transmitter in the on state and an off-only test in which the two measurement signals are received with the transmitter in the off state.

5. The system according to claim 4 wherein the controller is arranged such that the on-only test follows the change-up test and the second measurement signal of the change-up test defines a first of the two measurement signals of the on-only test.

6. The system according to claim 5 wherein the controller is arranged such that the second measurement value of the change-up test defines the respective measurement value corresponding to the first of the two measurement signals of the on-only test.

7. The system according to claim 4 wherein the controller is arranged such that the change-down test follows the on-only test and the first measurement signal of the change-down test is defined by a second of the two measurement signals of the on-only test.

8. The system according to claim 7 wherein the controller is arranged such that the first measurement value of the change-down test is defined by the respective measurement value corresponding to the second of the two measurement signals of the on-only test.

9. The system according to claim 4 wherein the controller is arranged such that the off-only test follows the change-down test and the second measurement signal of the change-down test defines a first of the two measurement signals of the off-only test.

10. The system according to claim 9 wherein the controller is arranged such that the second measurement value of the change-down test defines the respective measurement value corresponding to the first of the two measurement signals of the off-only test.

11. The system according to claim 4 wherein the controller is arranged such that the change-up, on-only, change-down and off-only tests are respectively carried out, then repeated.

12. The system according to claim 11 wherein the controller is arranged such that, in repetition of the tests, the change-up test follows the off-only test and the first measurement signal of the change-up test is defined by a second of the two measurement signals of the off-only test.

13. The system according to claim 2 wherein the controller is arranged such that one of the two measurement signals of the same-state test is defined by a respective one of the first and second measurement signals of the state-change test.

14. The system according to claim 13 wherein the controller is arranged such that the one of the two respective measurement signals of the same-state test is defined by the measurement value associated with the respective one of the first and second measurement values of the state-change test.

15. The system according to claim 1 wherein the controller is arranged such that the at least one state-change test comprises a change-up test in which the first and second measurement signals are received with the transmitter in the off and on states respectively and a change-down test in which the first and second measurement signals are received with the transmitter in the on and off states respectively.

16. The system according to claim 1 wherein the controller is arranged to begin a sequence of tests and terminate the sequence of tests prior to completion thereof should results of any test within the sequence indicate absence of the object in the path of the detection signal proximate the transmitter.

17. The system according to claim 16 wherein the controller is arranged to output a presence detection signal upon completion of the sequence of tests.

18. The system according to claim 1 wherein the controller is arranged to determine the range using an ambient conditions measurement value based on an ambient conditions measurement signal sent from the receiver with the transmitter in the off state.

19. A system for detecting the presence of an object, the system comprising:
- a transmitter operable to switch between on and off states to respectively activate and deactivate emanation of a detection signal from the transmitter along a path;
- a receiver positioned to receive a reflection of the detection signal from off the object when situated proximate the transmitter in the path of the detection signal and generate a measurement signal in response to signals received by the receiver; and
- a controller connected to the transmitter and the receiver to control switching of the transmitter between the on and off states, to selectively receive the measurement signal and associate a measurement value therewith, and to establish a range of values around the measurement value spanning from a lower range limit below the measurement value to an upper range limit above the measurement value;

the controller being arranged to perform:
- a calibration step in which the controller receives an ambient conditions signal from the receiver with the transmitter in the off state, associates an ambient conditions value with said ambient conditions signal and calculates a range determination value based on said ambient conditions value;
- a change-up test in which the controller adds and subtracts the range determination value to and from a first change-up test value associated with a first change-up test signal received from the receiver with the transmitter in the off state to establish a range of change-up test values around said first change-up test value, receives a second change-up test signal from the receiver with the transmitter in the on state, associates a second change-up test value with the second change-up test signal, and determines whether the second change-up test value falls inside the range of change-up test values, which indicates absence of the object in the path of the detection signal proximate the transmitter;
- a change-down test in which the controller adds and subtracts the range determination value to and from a first change-down test value associated with a first change-down test signal received from the receiver with the transmitter in the on state to establish a range of change-down test values around said first change-down test value, receives a second change-down test signal from the receiver with the transmitter in the off state, associates a second change-down test value with the second change-down test signal, and determines whether the second change-down test value falls inside the range of change-down test values, which indicates absence of the object in the path of the detection signal proximate the transmitter; and
- at least one same-state test in each of which the controller adds and subtracts the range determination value to and from a first same-state test value associated with a first same-state test signal received from the receiver with the transmitter in a respective one of the on and off states to establish a first range of same-state test values around said first same-state test value, receives a second same-state test signal from the receiver with the transmitter in the opposite one of the on and off states, associates a second same-state test value with the second same-state test signal, and determines whether the second same-state test value falls inside the range of same-state test values, which indicates absence of the object in the path of the detection signal proximate the transmitter.

20. A method for detecting the presence of an object, the method comprising:
- providing a transmitter operable to switch between an on state in which a detection signal emanates from the transmitter along a path and an off state in which no such signal detection signal emanates from the transmitter;
- providing a receiver positioned to receive a reflection of the detection signal from off the object when situated proximate the transmitter in the path of the detection signal and generate a measurement signal in response to signals received by the receiver;
- providing a controller connected to the transmitter and the receiver to control switching of the transmitter between the on and off states, to selectively receive the measurement signal and associate a measurement value therewith, and to establish a range of values around the measurement value spanning from a lower range limit below the measurement value to an upper range limit above the measurement value; and
- performing at least one state-change test each comprising:
  - sending a first measurement signal from the receiver to the controller while the transmitter is in a respective one of the on and off states;
  - associating a first measurement value with the first measurement signal;
  - establishing a first range of values around said first measurement value;
  - switching the transmitter into a respective opposite one of the on and off states;
  - sending a second measurement signal from the receiver to the controller while the transmitter is in said opposite one of the on and off states;
  - associating a second measurement value with the second measurement signal; and
  - determining whether the second measurement value falls inside the first range of values, which indicates absence of the object in the path of the detection signal proximate the transmitter.

* * * * *